Figures 3, 4:
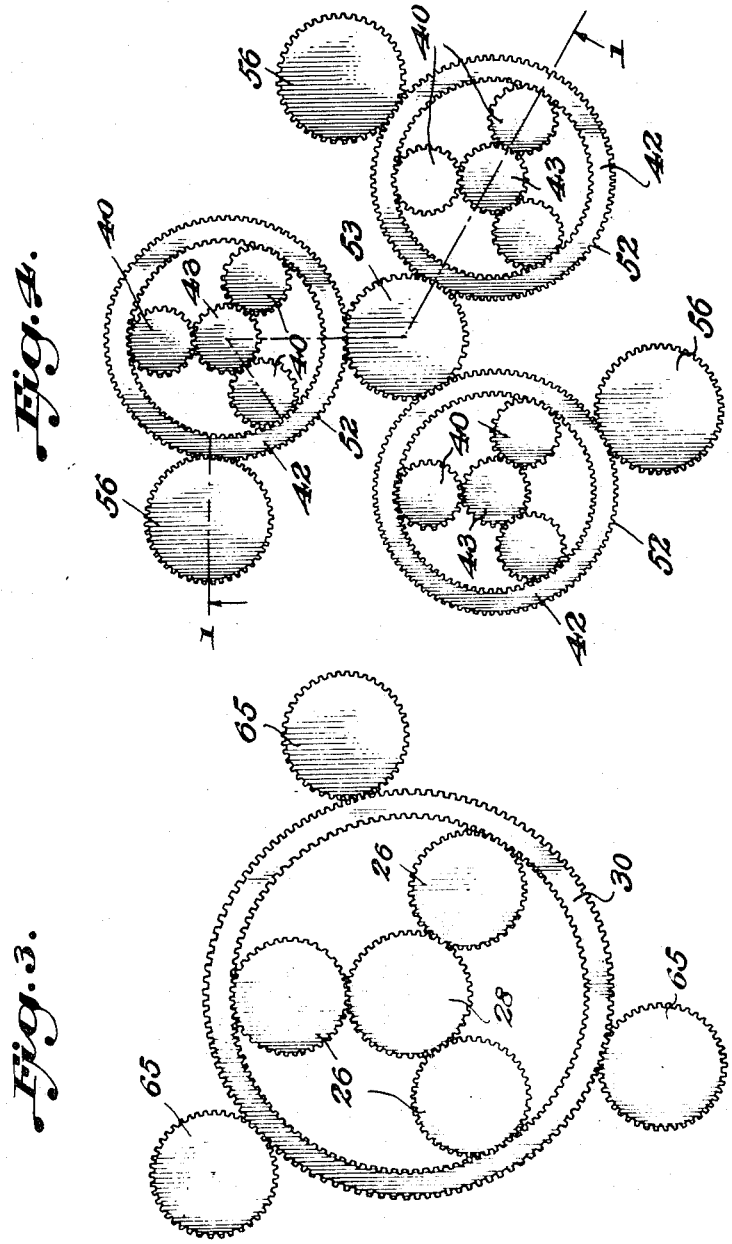

Oct. 18, 1949.  H. L. MISCH  2,485,503
GEARING
Filed Sept. 3, 1946  3 Sheets-Sheet 1
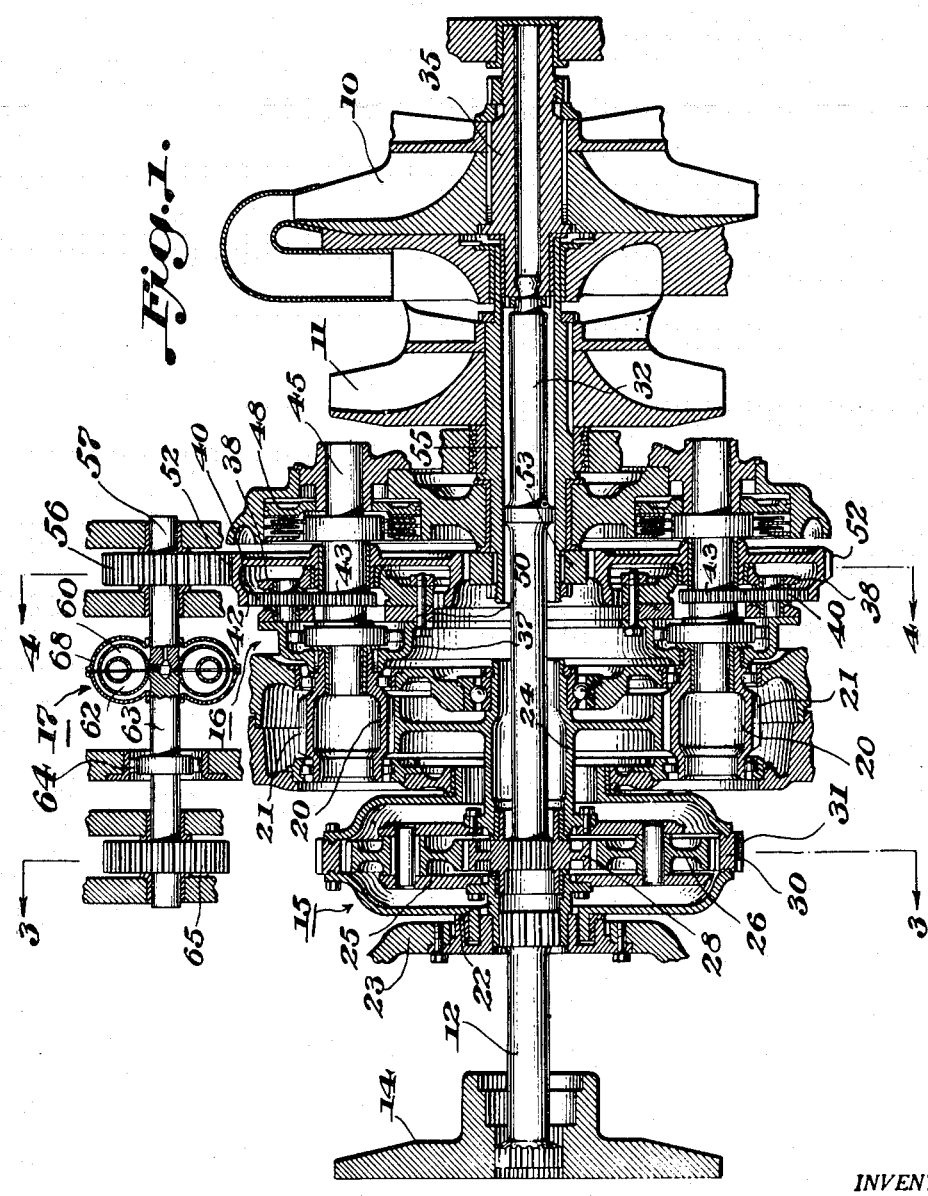
INVENTOR.
Herbert L. Misch,
BY
Watson, Cole, Grindle & Watson
ATTYS.

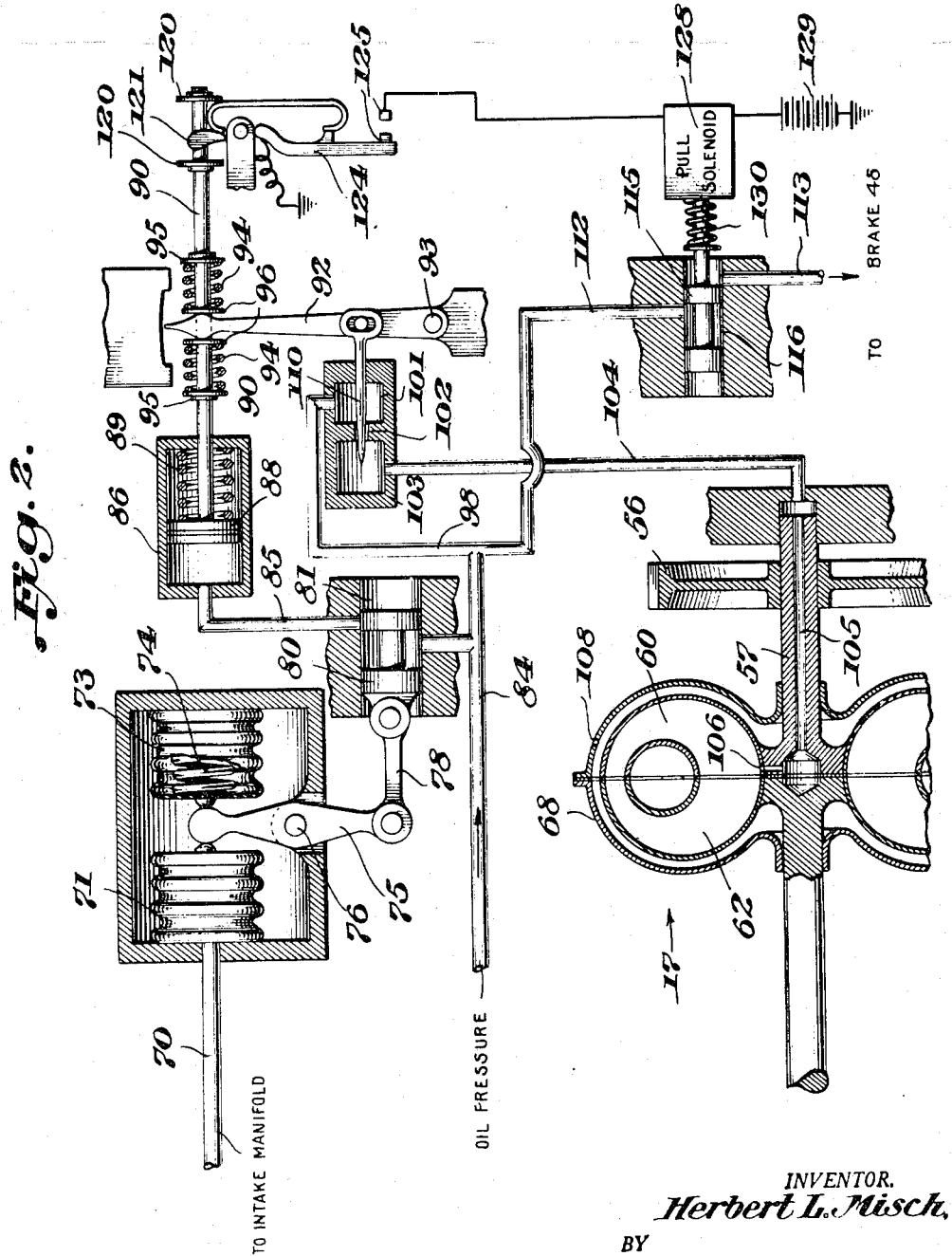

Oct. 18, 1949.  H. L. MISCH  2,485,503
GEARING

Filed Sept. 3, 1946  3 Sheets-Sheet 3

INVENTOR.
Herbert L. Misch,
BY
Watson, Cole, Grindle & Watson
ATTYS

UNITED STATES PATENT OFFICE 2,485,503

GEARING

Herbert L. Misch, Ferndale, Mich., assignor to Packard Motor Car Company, Detroit, Mich., a corporation of Michigan Application September 3, 1946, Serial No. 694,570

9 Claims. (Cl. 230—11)

This invention relates to improvements in variable speed ratio gearing and more especially to gearing adapted to drive the several impellers of multistage superchargers for aircraft engines. It is an object of the invention to provide gearing affording a continuously variable speed ratio for the driving of at least one of the impellers, whereby a substantially constant gaseous charge may be delivered to the engine regardless of the wide variation in barometric pressure exhibited at different altitudes. It is a feature of the invention that the major part of the power required to drive the supercharger is transmitted through a gear train affording a positive drive.

Thus, in the preferred embodiment of the invention, continuously variable speed gearing is employed only in the drive for the first stage impeller, subsequent stages being driven either at a fixed ratio, or at one of several selected ratios through positive drive gearing. Furthermore, a positive drive gear train is provided for the first impeller, and serves to traansmit the entire torque thereto at the lowest ratio, only part of the torque additionally required to drive the first impeller at higher speeds being transmitted through devices affording continuously varying ratios. It is, therefore, possible to employ, for the purpose of obtaining continuously variable speed, devices which develop considerable friction in operation and which are therefore incapable of transmitting heavy loads without overheating.

For instance, in the practice of the invention I may employ a fluid clutch capable of operation at an infinite number of speed ratios, selection of the appropriate ratio being effected automatically in response to pressure variation in the intake manifold of the engine. Such clutches are simple and compact, and when used as proposed herein, merely in order to increase the speed of the impeller above a predetermined minimum speed obtained by a positive gear train, are able to function with reasonable efficiency and without excessive heating. The speed ratio afforded by such clutchs may conveniently be varied by regulation of the volume of working fluid in the clutch unit, and simple mechanism, responsive to pressure change, may be employed to effect such regulation.

It is therefore a further object of the invention to provide a drive for an impeller of a supercharger in which the principal torque is transmitted through positive transmission gearing, and in which only a part of the relatively low torque required to increase the impeller speed to meet changes in operating conditions is transmitted through devices affording automatically and continuously variable speed ratios.

A further object of the invention is the provision of means driving the impellers of a multistage supercharger at different speeds, the speed of one impeller being automatically and continuously varied in accordance with pressure conditions, and preferably in response to variation in pressure of the gaseous charge delivered to the engine. By effecting such variation in speed of the first stage impeller, as in the preferred embodiment of the invention, the power consumed in driving the second stage impeller is correspondingly varied, and it is thus possible to operate the supercharger with minimum power requirements over the entire range of operating conditions normally encountered in aircraft.

Further objects and features of the invention will be apparent from the following description, taken in connection with the accompanying drawings, in which Figure 1 is a longitudinal section through gearing for driving a multistage supercharger, embodying the principles of the invention, the section being taken substantially on the line 1—1 of Figure 4;

Figure 2 is a diagrammatic representation of one form of control mechanism for effecting speed regulation of the gearing of Figure 1; and Figures 3 and 4 are transverse sectional views taken substantially on the lines 3—3 and 4—4 respectively of Figure 1.

To facilitate an understanding of the principles of the invention, reference is made herein to the embodiment shown in the drawings, and specific language is used to describe the same. It will, nevertheless, be understood that no limitation of the scope of the invention is threby intended, such modifications and alterations being contemplated as would occur to those skilled in the art to which the invention relates.

Figure 1 illustrates one method of applying the invention to the driving of a two-stage supercharger, shown schematically in the drawing, and including a first stage impeller 10 and a second stage impeller 11. The supercharger details form no part of the instant invention; the construction may follow any conventional design, provided the impellers of the respective stages are so mounted that they may be driven separately and at different speeds. Air compressed in the first stage of the supercharger is returned to the second stage, where it is further compressed, and is thence delivered to the intake manifold of the engine. One of the objects of the invention is so to regulate the speeds of the impellers that the gaseous charge thus supplied to the engine is of substantially constant density regardless of variation in external barometric pressure. The supercharger is driven from the engine crankshaft, the quill shaft 12, splined to crankshaft coupling flange 14, being considered the drive shaft for the supercharger for the purpose of this description.

The more essential components of the gearing connecting drive shaft 12 with impellers 10 and 11 are the planet gear trains 15 and 16, and the continuously variable speed ratio coupling 17. Part of the torque transmitted from shaft 12 through spur gears 20 and 21 to planet train 16 affords a positive drive for second stage impeller 11. A positive drive at low speed is also supplied through planet train 15 to first stage impeller 10. Operation of impeller 10 at higher speeds is obtained through the continuously variable speed coupling 17, which is driven from planet train 16, and which supplies a part of the added torque for higher speeds to reactive member or fulcrum of planet train 15. The speed ratio of coupling 17 is automatically varied in response to pressure changes in the engine charge. The several elements of the gearing will now be described in more detail.

Drive shaft 12 is splined at one end to crank shaft coupling flange 14, and at its other end to a flanged sleeve 22, journaled in the transmission frame member 23. Sleeve 22, and a second flanged sleeve 24, are bolted to a planet carrier 25, on which are journaled a plurality of planet gears 26, three being shown, these planet gears meshing with sun gear 28 and orbit gear 30. The orbit gear, which is mounted for independent rotation in the transmission frame, is provided with external teeth 31, for a purpose hereinafter described. A shaft 32 is splined at one end within sun gear 28 and is connected for rotation at its opposite end to sleeve 35 on which impeller 10 of the first stage of the supercharger is rigidly mounted.

It will be observed from the structure thus far described that if drive shaft 12 be rotated in a clockwise direction as viewed from the left-hand or crank shaft end of the gearing, planet carrier 25 and gears 26 will revolve about the drive shaft axis in a clockwise direction. Thus, if orbit gear 30 is restrained from clockwise rotation, the planet gears 26 will be rotated on their axes in a counter clockwise direction, thereby driving sun gear 28, shaft 32, and impeller 10 in a clockwise direction at increased speed. This affords a low speed positive drive for the first stage impeller, the orbit gear 30 constituting the reaction member or fulcrum of the planet train. For the purpose of restraining clockwise rotation of the orbit gear 30, a one-way brake may be applied in the known manner between the support for this gear and the transmission frame. However, I prefer to introduce such a brake at another point in the transmission, in conjunction with structure hereinafter described.

As will be apparent from an inspection of Figure 4 of the drawings, several planet gear trains 16, each driving a separate variable speed coupling 17, may be employed, three being illustrated. For convenience in describing the invention, reference is made specifically only to one of these trains, the corresponding elements of the remaining trains being identified by the same reference characters with distinguishing subscripts.

As hereinbefore explained, the second planet gear train 16 is driven through spur gears 21 and 20 from drive shaft 12. Thus gear 20 is rigid or formed integrally with sleeve 24, the latter being connected to drive shaft 12 through the planet carrier 25, so that gear 21 is rotated in a counter clockwise direction. Coupling flange 37 is splined to the hub of gear 21 and bolted to planet carrier 38 of the planet gear train 16. Planet gears 40, mounted on carrier 38, are in mesh with orbit gear 42 and sun gear 43, the latter being rigidly mounted on shaft 45, which is journaled for rotation in the transmission housing as shown in the drawing. A brake 48 of the friction plate type is operatively connected between shaft 45 and the transmission housing, alternate plates of the brake being keyed to the shaft and the housing. Thus when axial pressure is applied to the brake to engage the plates, for instance by the conventional hydraulic controls, shaft 45 and sun gear 43 may be held against rotation, so that the sun gear 43 may serve as the fulcrum or reaction member of the planet train 16, with the result that orbit gear 42 is driven at an increased speed in a counter clockwise direction.

A one-way clutch 50, preferable of the ball or roller type, acts between coupling flange 37 and shaft 45 to prevent rotation of shaft 45 and sun gear 43 in a counter clockwise direction with respect to coupling flange 37 and planet carrier 38. Thus if brake 48 be released, so as to free sun gear 43 for rotation, clutch 50 will have the effect of locking the planet train 16 for rotation as a unit, and orbit gear 42 is thus driven in a counter clockwise direction at a reduced speed, namely the speed of rotation of spur gear 21. It is therefore possible, by manipulating the friction brake 48, to provide for the driving of the orbit gear 42 of the planet train 16 in either of two selected speed ratios.

External teeth 52 are provided on orbit gear 42 for meshing relation with the teeth of spur gear 53 which is splined to sleeve 55, on which is rigidly mounted the impeller 11 of the second stage of the supercharger. Thus impeller 11 is driven positively in a clockwise direction at either of two selected speed ratios, the selection being effected by manipulation of friction brake 48.

The external teeth 52 on orbit gear 42 of planet train 16 are also in mesh with spur gear 56, which is mounted for rotation with supporting shaft 57, which is in turn rigidly secured to the driving element 60 of continuously variable speed ratio coupling 17, the driven element of the coupling being indicated at 62 and being rigid with shaft 63. Counter clockwise rotation of shaft 63 is prevented by one-way brake 64, acting between the shaft and the transmission frame. Spur gear 65, rigidly mounted on shaft 63, is in mesh with external teeth 31 on orbit gear 30 of planet train 15. Thus it will be observed that one-way brake 64 functions to prevent clockwise rotation of orbit gear 30, so that this gear may serve as the reaction member of planet train 15 as hereinbefore described.

As is apparent from an inspection of Figure 4 of the drawings, the structure just described, including spur gears 56 and 65 and variable speed ratio coupling 17, would not normally appear in its entirety in the sectional view represented by Figure 1. For the purpose of clarity, the structure has been rotated about the orbit of the planet train 16 so that it appears in Figure 1 immediately above the planet train.

The variable speed coupling 17 may be of the type shown in the patent to Wahlmark 2,344,335 which describes a fluid transmission device which may be so controlled as to select an infinite number of speed ratios between the driving and driven elements of the transmission. However, since provision is made, in accordance with the instant invention, to minimize the amount of power transmitted through the variable coupling 17 as hereinbefore explained, I may employ a simplified form of continuously variable speed ratio coupling, such as the conventional hydraulic or fluid clutch. Thus coupling 17, as illustrated more particularly in Figure 2 of the drawings, may comprise essentially a generally toroidal housing 68 in which are supported for rotation the driving and driven elements 60 and 62 of the coupling, these elements having cooperating blades for the displacement of working fluid, such as oil, within the housing 68. The structure of the elements of the coupling may vary widely, but I prefer to use a clutch constructed and functioning generally in the manner of the fluid flywheel B of the patent to Martin, 1,885,746. By regulating the amount of fluid within the housing 68, as hereinafter more fully explained, the torque transmitted between the driving and driven elements 60 and 62 may be varied, with resultant variation in the ratio of rotational speed of these elements. With such a device it is possible to establish speed ratios between the driven and driving elements ranging from zero to a value approaching 1:1, and since the driving element 60 of the coupling may be driven at either of two fixed speed ratios by selective manipulation of brake 48, a fairly wide range of speed of the driven element 62 of the coupling may be obtained by control of the working fluid.

As has been described, first stage impeller 10 is rotated at a relatively low speed through planet gear train 15 when orbit gear 30 is retained against clockwise rotation, as by one-way brake 64. If, however, sufficient fluid is introduced in housing 68 of coupling 17 to initiate torque transmission through the elements 60 and 62, spur gear 65, rotating clockwise, will tend to drive orbit gear 30 in a counter clockwise direction, thus accelerating the rotation in a counter clockwise direction of planet pinions 26, which in turn accelerate the rotation of sun gear 28 in a clockwise direction, thereby driving impeller 10 at an increased speed. As the amount of working fluid in coupling 17 is further increased, the speed at which first stage impeller 10 is driven is correspondingly increased, an infinite number of speed ratios being thereby obtained.

Reference is now made to Figure 2 for a schematic showing of one method of varying the speed ratio of coupling 17 by regulation of the amount of working fluid therein, it being understood that the apparatus of Figure 2 may be employed for concurrent variation of available fluid in each of the three coupling devices corresponding to coupling 17.

A conduit 70 communicates at one end with the intake manifold of the engine, and at its other end with the interior of a bellows 71, whereby the pressure within the bellows varies with the intake pressure. A compensating bellows 73, extended by a coil spring 74, opposes bellows 71, both bellows acting on lever 75. It will be appreciated that by the use of the second bellows, the effect of variation in barometric pressure on bellows 71 is substantially eliminated, lever 75 being displaced about its pivot point 76 primarily in response to change in pressure of the gaseous charge supplied to the engine by the supercharger.

A valve 80, reciprocated in valve chamber 81 by lever 75 and link 78, is interposed between fluid pressure line 84, which may be supplied with oil under pressure from the engine, and conduit 85 which communicates with cylinder 86. Thus if valve 80 is moved to the right as shown in Figure 2, response to decrease in pressure at the engine intake, fluid thereby admitted to cylinder 86 will displace piston 88 and piston rod 90 to the right against the action of spring 89. Piston rod 90 extends through an opening in a lever 92 which is pivoted at 93. Coil springs 94 are compressed between abutments 95, rigid with the rod, and abutments 96, loosely mounted on the rod and engaging lever 92. Thus lever 92 is yieldingly constrained by springs 94 to follow the reciprocal movement of rod 90.

Fluid pressure line 84 is also connected through conduit 98 to chamber 101, from which fluid may flow through valve passage 102 into chamber 103, flowing thence through conduit 104 and through passages 105 and 106 to the interior of housing 68. Bleed opening 108 in housing 68 permits continuous discharge of fluid from the housing, the fluid thus discharged being returned to the system in any convenient manner. Control of fluid flow into the housing is effected by needle valve 110, which is reciprocated in valve passage 102 by lever 92, displacement of lever 92 to the right increasing the flow of fluid into the housing 68.

In operation, whenever the engine intake pressure falls below a predetermined value, needle valve 110 is displaced to the right, as described, to increase the flow of fluid into housing 68 of coupling 17. Since fluid is discharged from housing 68 through bleed opening 108 at a substantially fixed rate, the volume of working fluid in the housing is thereby increased, and the driven element 62 of coupling 17 is caused to rotate at a higher speed, thus accelerating the speed of first stage impeller 10. This increase in the speed of rotation of the first stage impeller will increase the pressure in bellows 71 to prevent further movement of valve 80 to the right, and lever 92 and needle valve 110 will ultimately assume a position of equilibrium corresponding to the adjusted intake pressure. If the pressure in the intake manifold should increase, the operation is reversed, valve 80 being displaced to the left to relieve the pressure in cylinder 86. Needle valve 110 is thus displaced to the left by the action of spring 89 on rod 90 and lever 92, so that the volume of fluid in coupling 17 is reduced, the speed of the first stage impeller 10 being correspondingly lowered. The pressure of the gaseous charge delivered to the engine will thereby be reduced to the optimum value.

The apparatus shown in Figure 2 may also be employed to operate brake 48 and thereby to select either of two speed ratios for planet gear train 16. Thus brake 48 may be applied and released by fluid pressure in the conventional manner, the fluid being derived from pressure line 84 through conduits 112 and 113. The control of the fluid is effected by slide valve 115 which is reciprocable in valve chamber 116, spring 130 urging the valve toward the left. Fixed abutments 120 are provided on rod 90, trigger 121 of a toggle switch 124 extending between these abutments. Thus if rod 90 is displaced sufficiently far to the right, as the result of substantial reduction in pressure in the engine intake manifold, switch 124 will be operated to engage switch contacts 125, thereby closing a circuit which includes in series a solenoid 128 and a battery 129. When energized, the solenoid acts to displace valve 115 to the right, thereby admitting fluid under pressure to conduit 113 to apply brake 48, and selecting the higher speed ratio for planet train 16. This effects increase in speed of rotation of second stage impeller 11, as hereinbefore explained, and also drives fluid coupling 17 at an increased speed, whereby the speed of rotation of first stage impeller 10 is increased. Release of brake 48 and selection of the lower speed ratio for planet train 16 is effected on reversal of these operations, displacement of rod 90 to the left serving to de-energize the solenoid 128, whereby valve 115 is returned by spring 130 to the position in which it is shown in Figure 2, the pressure being removed from conduit 113 and the brake being thereby released.

It is a well known expedient in the field of planetary gearing to select various elements as the driving the driven, and the reaction or fulcrum members of the train. In its broader aspects, therefore, the instant invention contemplates such use of the several elements of the planet trains 15 and 16 as will provide the proper ratios and the desired mode of operation of each train, and is not necessarily limited to the specific arrangements herein illustrated.

It will also be appreciated that the invention is applicable to gear transmissions for driving superchargers having more than two stages, additional stages being driven either at continuously variable speed ratios, as is the first stage of the illustrated embodiment, or at selected fixed ratios, as is the second stage shown herein. The invention is also applicable to single or multiple stage superchargers in which the impeller of each stage is driven at continuously variable speed ratios, constructed and operated as herein proposed. However, the form of the invention illustrated herein, involving speed regulation of the first stage impeller only, with consequent variation in the power requirements of the whole supercharger, lends itself particularly well to the supercharging of aircraft engines, the pumping capacity of the impellers under all conditions being just sufficient to provide the required compression ratio for the engine, whereby the net power delivered to the aircraft propeller is a maximum for any given manifold pressure at all altitudes.

Having thus described the invention, what is claimed as new and desired to be secured by Letters Patent is:

1. Apparatus for driving the impellers of a multistage supercharger for an aircraft engine, said supercharger having a first stage impeller and an impeller of a succeeding stage, comprising, in combination, a drive shaft, a planet gear train including a reacting member serving as a fulcrum for said train, connections between said drive shaft and a second member of said planet train, means connecting a third member of said planet train with the first stage impeller to drive the latter at a low speed, gearing connecting said driving shaft with the impeller of said succeeding stage, and devices including continuously variable speed ratio mechanism connecting said last named gearing with the reacting member of said planet train to drive the third member of said train and thereby the first stage impeller at higher speeds than said low speed.

2. Apparatus for driving the impellers of a multistage supercharger for an aircraft engine, said supercharger having a first stage impeller and an impeller of a succeeding stage, comprising, in combination, a drive shaft, a planet gear train including a reacting member serving as a fulcrum for said train, connections between said drive shaft and a second member of said planet train, means connecting a third member of said planet train with the first stage impeller to drive the latter at a low speed, gearing connecting said driving shaft with the impeller of said succeeding stage, devices including continuously variable speed ratio mechanism connecting said last named gearing with the reacting member of said planet train to drive the third member of said train and thereby the first stage impeller at higher speeds than said low speed, and means responsive to variation in delivery pressure of said supercharger and operatively connected with said mechanism for regulating the speed ratio thereof.

3. Apparatus for driving an impeller of a supercharger for an aircraft engine comprising, in combination, a drive shaft, means including a planet gear train connecting said drive shaft and the impeller, said panet train including a reacting member serving as a fulcrum, means resisting rotation of said reacting member in one direction to drive said impeller at a low speed, and mechanism for rotating said reacting member in the opposite direction to increase the speed of the impeller, said mechanism including a variable speed fluid clutch, gearing driving said clutch from said drive shaft at a higher speed, a driving connection between said clutch and said reacting member, and control devices responsive to variation in delivery pressure of said supercharger and operatively connected with said fluid clutch to regulate the volume of fluid therein and thereby vary the speed ratio of said clutch.

4. Apparatus for driving the impellers of a multistage supercharger for an aircraft engine, said supercharger having a first stage impeller and an impeller of a succeeding stage, comprising, in combination, a drive shaft, means including a planet gear train connecting said drive shaft and the first stage impeller, said planet train including a reacting member serving as a fulcrum, means resisting rotation of said reacting member in one direction to drive said first stage impeller at a low speed, and mechanism for rotating said reacting member in the opposite direction to increase the speed of the first stage impeller, said mechanism including a continuously variable speed ratio device, and gearing affording a positive drive from said drive shaft to said device and to the impeller of said succeeding stage.

5. Apparatus for driving the impellers of a multistage supercharger for an aircraft engine, said supercharger having a first stage impeller and an impeller of a succeeding stage, comprising, in combination, a drive shaft, means including a planet gear train connecting said drive shaft and the first stage impeller, said planet train including a reacting member serving as a fulcrum, means resisting rotation of said reacting member in one direction to drive said first stage impeller at a low speed, and mechanism for rotating said reacting member in the opposite direction to increase the speed of the first stage impeller, said mechanism including a continuously variable speed ratio device, and gearing affording a positive drive from said drive shaft to said device and to the impeller of said succeeding stage, said gearing affording at least two speed ratios, and control means for selecting either of said ratios.

6. Apparatus for driving the impellers of a multistage supercharger for an aircraft engine, said supercharger having a first stage impeller and an impeller of a succeeding stage, comprising, in combination, a drive shaft, means including a planet gear train connecting said drive shaft and the first stage impeller, said planet train including a reacting member serving as a fulcrum, means resisting rotation of said reacting member in one direction to drive said first stage impeller at a low speed, and mechanism for rotating said reacting member in the opposite direction to increase the speed of the first stage impeller, said mechanism including a continuously variable speed ratio device, and gearing affording a positive drive from said drive shaft to said device and to the impeller of said succeeding stage, said gearing affording at least two speed ratios, control means for selecting either of said ratios, and means responsive to variation in delivery pressure of said supercharger and operatively connected with said continuously variable speed ratio device and with said control means to effect variation in speed ratio of said device and said gearing.

7. Apparatus for driving the impellers of a multistage supercharger for an aircraft engine, said supercharger having a first stage impeller and an impeller of a succeeding stage, comprising, in combination, a drive shaft, a planet gear train including a reacting member serving as a fulcrum for said train, connections between said drive shaft and a second member of said planet train, means connecting a third member of said planet train with the first stage impeller to drive the latter at a low speed, gearing connecting said driving shaft with the impeller of said succeeding stage, devices including a fluid clutch connecting said last named gearing with the reacting member of said planet train to drive the third member of said train and thereby the first stage impeller at higher speeds, and means responsive to variation in pressure at the engine intake for varying the volume of working fluid in said clutch to alter the speed ratio thereof.

8. Apparatus for driving the impellers of a multistage supercharger for an aircraft engine, said supercharger having a first stage impeller and an impeller of a succeeding stage, comprising, in combination, a drive shaft, a planet gear train including a reacting member serving as a fulcrum for said train, connections between said drive shaft and a second member of said planet train, means connecting a third member of said planet train with the first stage impeller to drive the latter at a low speed, gearing having at least two selective speed ratios connecting said driving shaft with the impeller of said succeeding stage, and devices including continuously variable speed ratio mechanism connecting said last named gearing with the reacting member of said planet train to drive the third member of said train and thereby the first stage impeller at higher speeds than said low speed.

9. Apparatus for driving the impellers of a multistage supercharger for an aircraft engine, said supercharger having a first stage impeller and an impeller of a succeeding stage, comprising, in combination, a drive shaft, a planet gear train including a reacting member serving as a fulcrum for said train, connections between said drive shaft and a second member of said planet train, means connecting a third member of said planet train with the first stage impeller to drive the latter at a low speed, gearing having at least two selective speed ratios connecting said driving shaft with the impeller of said succeeding stage, and devices including continuously variable speed ratio mechanism connecting said last named gearing with the reacting member of said planet train to drive the third member of said train and thereby the first stage impeller at higher speeds than said low speed, and means responsive to variation in delivery pressure of the supercharger for controlling the speed ratio of said continuously variable mechanism and for selecting the speed ratio of said gearing.

HERBERT L. MISCH.

REFERENCES CITED

The following references are of record in the file of this patent:

UNITED STATES PATENTS

| Number | Name | Date |
|---|---|---|
| 2,015,300 | Dell et al. | Sept. 24, 1935 |
| 2,158,557 | Lammeren | May 16, 1939 |
| 2,400,307 | Hobbs et al. | May 14, 1946 |
| 2,400,964 | Vincent | May 28, 1946 |
| 2,418,102 | Vincent | May 25, 1947 |

FOREIGN PATENTS

| Number | Country | Date |
|---|---|---|
| 393,295 | Great Britain | May 30, 1933 |
| 504,367 | Great Britain | July 19, 1937 |